United States Patent [19]

Michelson

[11] Patent Number: 5,445,068
[45] Date of Patent: Aug. 29, 1995

[54] APPARATUS AND METHOD FOR EXTRACTING JUICE FROM CITRUS FRUITS

[76] Inventor: Yigal Michelson, 3 Hashkedim, 37000 Padres Hanna, Israel

[21] Appl. No.: 253,175

[22] Filed: Jun. 2, 1994

[51] Int. Cl.⁶ .............................................. A23N 1/00
[52] U.S. Cl. ........................................ 99/504; 99/510; 99/515; 99/538; 241/168; 241/169
[58] Field of Search ................. 99/501, 502, 504, 505, 99/506, 510, 515, 544, 511, 512, 538, 541, 542; 241/168, 169, 282.1, 169.1

[56] References Cited

U.S. PATENT DOCUMENTS

| | | | |
|---|---|---|---|
| 1,631,854 | 6/1927 | Carroll | 99/542 |
| 1,838,626 | 12/1933 | Hurst | 99/515 |
| 2,243,025 | 5/1941 | Wilson | 99/515 |
| 2,835,294 | 5/1958 | Rigney | 99/544 |
| 2,944,576 | 7/1960 | Acosta | 99/501 |
| 4,204,467 | 5/1980 | Peters | 99/544 |

*Primary Examiner*—David Scherbel
*Assistant Examiner*—Reginald L. Alexander
*Attorney, Agent, or Firm*—Mark M. Friedman

[57] ABSTRACT

A device for the in situ separation of the juice of a juicy fruit, such as a citrus fruit, from the rest of the fruit which includes a grasping mechanism for grasping the citrus fruit and a rotating mechanism for rotating the fruit. The device further includes a piercing member for piercing the fruit. The piercing member includes a mechanism for sweeping the internals of the fruit. In one embodiment, the piercing member has a body and a pivotable member which is pivotably connected to the body. The pivotable member is pivotable about a pivot point so as to move within the citrus fruit as the citrus fruit is rotated to thereby bring about the separation of the juice of the citrus fruit from the rest of the citrus fruit through centrifugal force. Finally, the device has a mechanism for pivoting the pivotable member about the pivot point. In another embodiment, the piercing member includes a blade which may be bent to sweep out the internals of the fruit.

16 Claims, 5 Drawing Sheets

APPARATUS AND METHOD FOR EXTRACTING JUICE FROM CITRUS FRUITS

FIELD AND BACKGROUND OF THE INVENTION

The present invention relates to a device and technique for separating the juice of a juicy fruit, such as a citrus fruit from the rest of the fruit.

A variety of devices are available or have been proposed for extracting juice from a juicy fruit, such as a citrus fruit, primarily oranges and grapefruits. For ease of presentation, the term citrus fruit will be primarily used in the description to cover any suitable substantially spherical juicy fruit. These can be roughly divided into industrial techniques used by large producers of citrus juice and techniques for use near the point of consumption, such as for home use or for use by a street vendor.

The industrial techniques operate primarily by crushing the citrus fruit and then filtering to remove the remnants of the peel, the pits and skin. The industrial juice extracting techniques are not of concern for purposes of the present invention.

The most common point of consumption techniques primarily require the citrus fruit to be first washed and then sliced in two. Each half is then mounted, typically sequentially, on a special device which facilitate the pressing of the citrus fruit so as to extract the juice from the rest of the fruit. The extracted juice is caught in a special container from which the juice is poured into a glass from which the consumer drinks.

These techniques suffer from a number of disadvantages. First, because the extracted juice can, and often does, come in contact with the outside surface of the peel, it is necessary to wash the fruit before extracting the juice to avoid contaminating the juice with dirt, chemical sprays, preservative coating, and the like, which might be present on the peel. Second, the conventional techniques require the use of a container for catching the extracted juice as well as a glass into which the juice is finally poured. This calls for the washing and handling of two containers.

There is thus a widely recognized need for, and it would be highly advantageous to have, a point of consumption device for extracting juice from a citrus fruit, such as an orange or grapefruit, which would readily extract the juice, with virtually no pits, from the fruit without requiring the pre-washing of the fruit and without the need to use any vessels for either collecting the extracted juice or its drinking.

SUMMARY OF THE INVENTION

According to the present invention there is provided a device for the in situ separation of the juice of a whole juicy fruit from the rest of the fruit, comprising: (a) means for grasping the juicy fruit; (b) means for rotating the grasped juicy fruit, the means for rotating being connected to the means for grasping; (c) a piercing member for piercing the juicy fruit being grasped by the means for grasping, the piercing member having a body and a shredding member connected to the body; and (d) means for moving the shredding member connected to the piercing member, the means for moving the shredding member causing the shredding member to move within the juicy fruit as the juicy fruit is rotated, the rotation of the juicy fruit taking place at sufficiently high rotational rate so as to bring about the separation of the juice of the juicy fruit from the rest of the juicy fruit by centrifugal force.

According to preferred embodiments according to the present invention, the shredding member is a pivotable member pivotably connected to the body, the pivotable member being pivotable about a pivot point so as to move within the juicy fruit as the juicy fruit is rotated to thereby bring about the separation of the juice of the juicy fruit from the rest of the juicy fruit, and wherein the means for moving the shredding member is a means for rotating the pivotable member about the pivot point.

According to the present invention, there is provided a method for the in situ separation of the juice of a whole juicy fruit from the rest of the fruit, comprising the steps of: (a) grasping the juicy fruit; (b) rotating the grasped juicy fruit; (c) piercing the grasped juicy fruit using a piercing member, the piercing member having a body and a shredding member connected to the body; and (d) moving the shredding member within the juicy fruit as the juicy fruit is rotated at sufficiently high rotational rates so as to thereby bring about the separation of the juice of the juicy fruit from the rest of the juicy fruit by centrifugal force.

According to further features in preferred embodiments of the invention described below, the pivotable member of the piercing member includes at least two blades extending radially outward from the pivot point.

According to still further features in the described preferred embodiments, the means for rotating the pivotable member includes a rod slidable within the piercing member, the rod being connected to the pivotable member so that movement of the rod brings about the pivoting of the pivotable member.

The present invention successfully addresses the shortcomings of the presently known configurations by providing a device for the in situ separation of the juice from the other components of a juicy fruit, such as a citrus fruit. The device utilizes centrifugal forces to separate the liquid juice from the solid components of the fruit with the latter accumulating at the inner walls of the peel of the fruit. The in situ separation of the juice from the solid components makes it possible to consume the drink directly by inserting a straw into the fruit through the pierced hole. This obviates the need to use a glass, typically disposable, thereby enhancing the hygienics and eliminating the environmental load of a disposable plastic container. In addition, the reduced exposure of the juice to the air minimizes the degradation of vitamin C, thereby enhancing its value.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a citrus juice extracting device. The principles and operation of a device according to the present invention may be better understood with reference to the drawings and the accompanying description.

Figure 1:
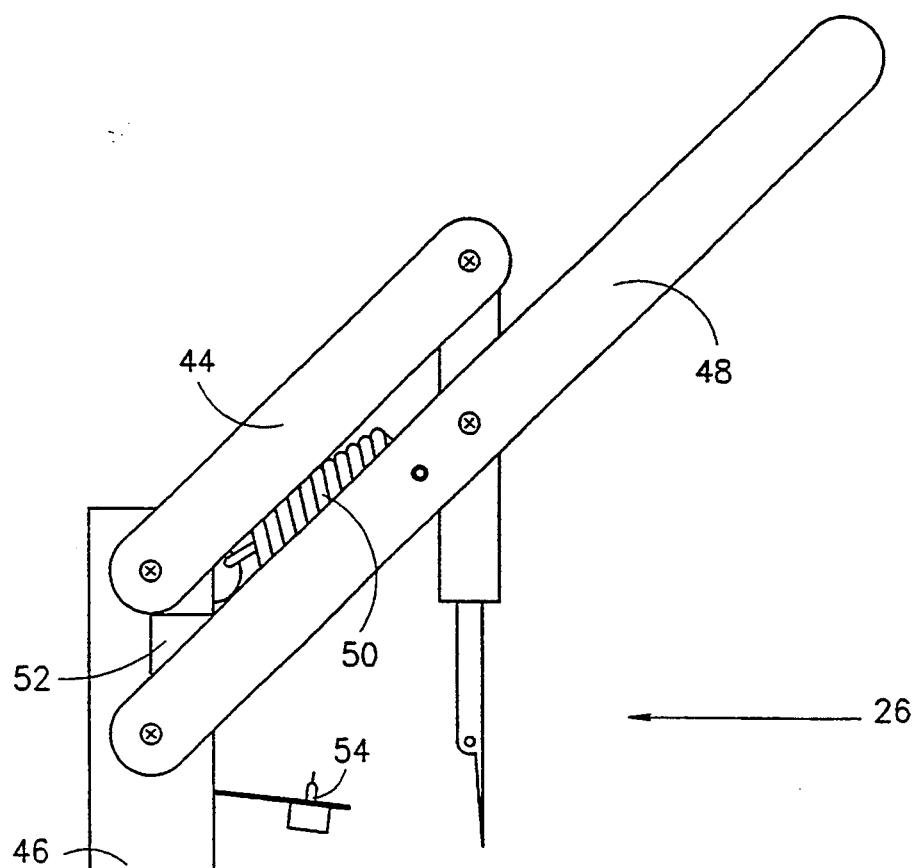
FIG. 1 shows a device according to the present invention as it appears between uses.
Figure 2:
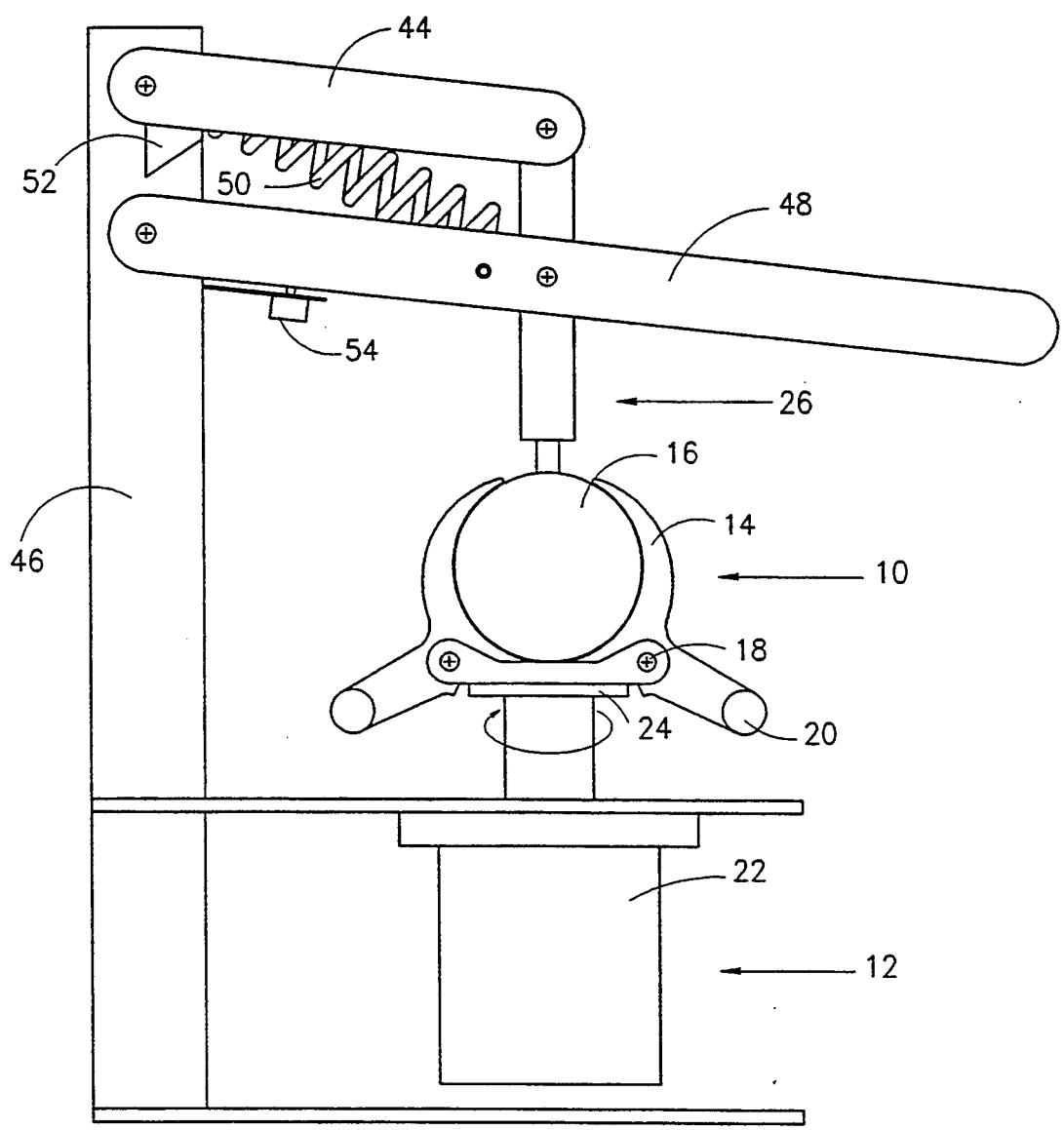
FIG. 2 shows the device of FIG. 1 as it appears during operation with a spherical citrus fruit.

Referring now to the drawings, FIGS. 1 and 2 illustrate one possible configuration of a device and method according to the present invention for the in situ separation of the juice of a citrus fruit from the rest of the fruit. Such a device includes suitable means for grasping 10 the citrus fruit and means for rotating 12 the citrus fruit.

Preferably, means for grasping 10 includes a plurality, typically 4 to six, of arms 14 which are capable of alternately moving toward each other so as to grasp a citrus fruit 16 (as in FIG. 2) and moving away from each other (as in FIG. 1) so as to allow citrus fruit 16 to be removed from, or inserted into, the device.

Any of a number of mechanisms may be utilized to alternately close and open arms 14. Preferably, as in shown in FIGS. 1 and 2, each of arms 14 is are pivotable about an arm pivot 18. The portion of each arm 14 which extends beyond arm pivot 18 preferably includes a weight 20 of suitable mass. This configuration resemble a speed governor and causes arms 14 to automatically close about fruit 16 when arms 14 are rotated and open when rotation is stopped, as described below.

Means for rotating 12 includes a suitable motor 22 which serves to rotate arm connector member 24 to which arms 14 are pivotably connected. Any suitable rotational speeds may be used provided that the rotational speeds are sufficiently high as to separate the solid components from the liquid juice by centrifugal force. When arms 14 are as described above, the rotation brings about the closing of arms 14 about fruit 16 (FIG. 2) as weights 20 are pushed radially outward by centrifugal forces while, in the absence of rotation, weights 20 which are affected by gravity and cause arms 14 to open (FIG. 1).

Figure 5:
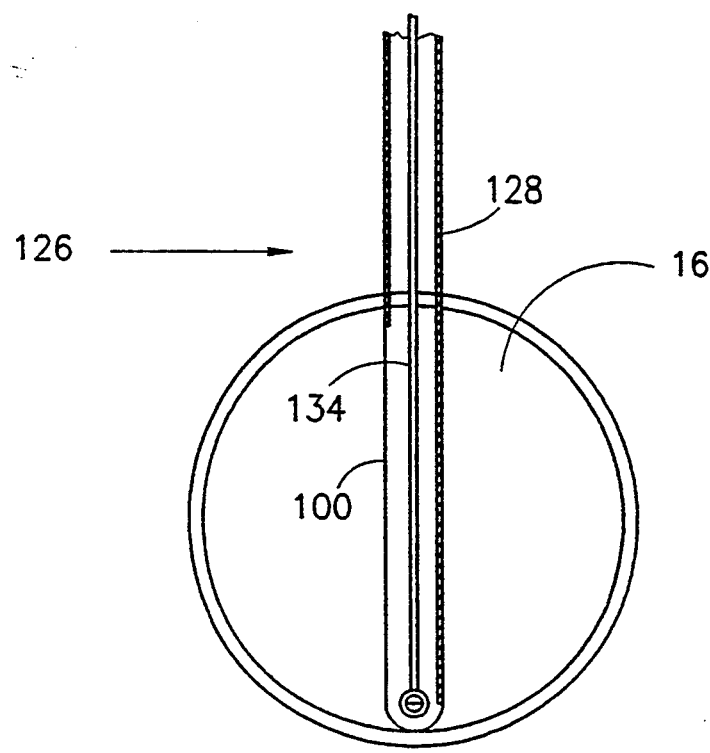
FIG. 5 is a side cross-sectional view of another embodiment of a piercing member with the single flexible shredding blade in its tight condition.
Figure 6:
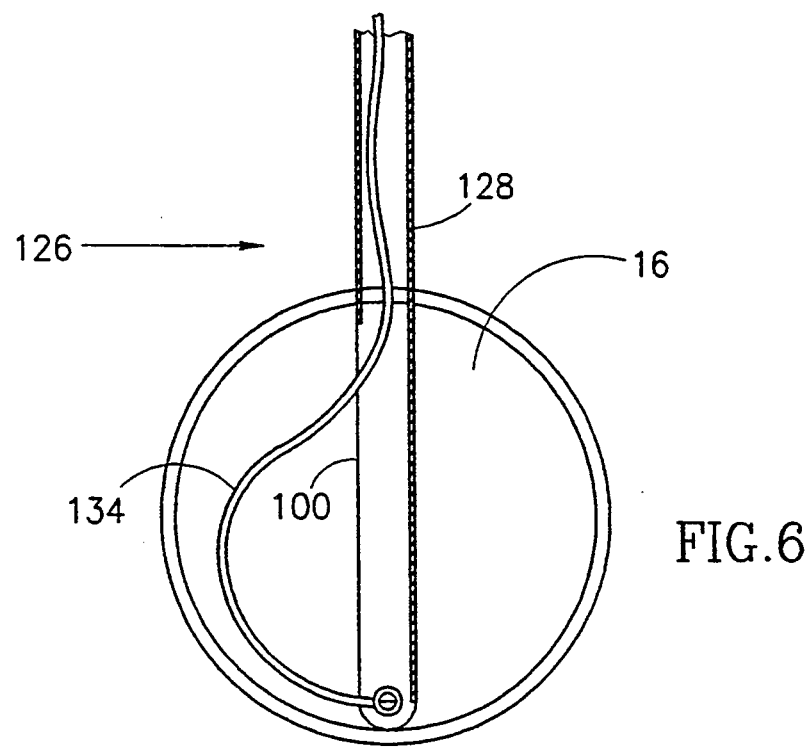
FIG. 6 is a side cross-sectional view as in FIG. 5 with the flexible shredding blade in its bent condition.

A device according to the present invention includes a piercing member 26 which acts to first pierce fruit 16 and to then bring about the in situ of the juice from the rest of fruit 16. Various piercing means may be envisaged. One embodiment of a piercing member 26 according to the present invention is shown in more detail in FIGS. 3 and 4. Another possible embodiment is illustrated in FIGS. 5 and 6.

Figure 3:
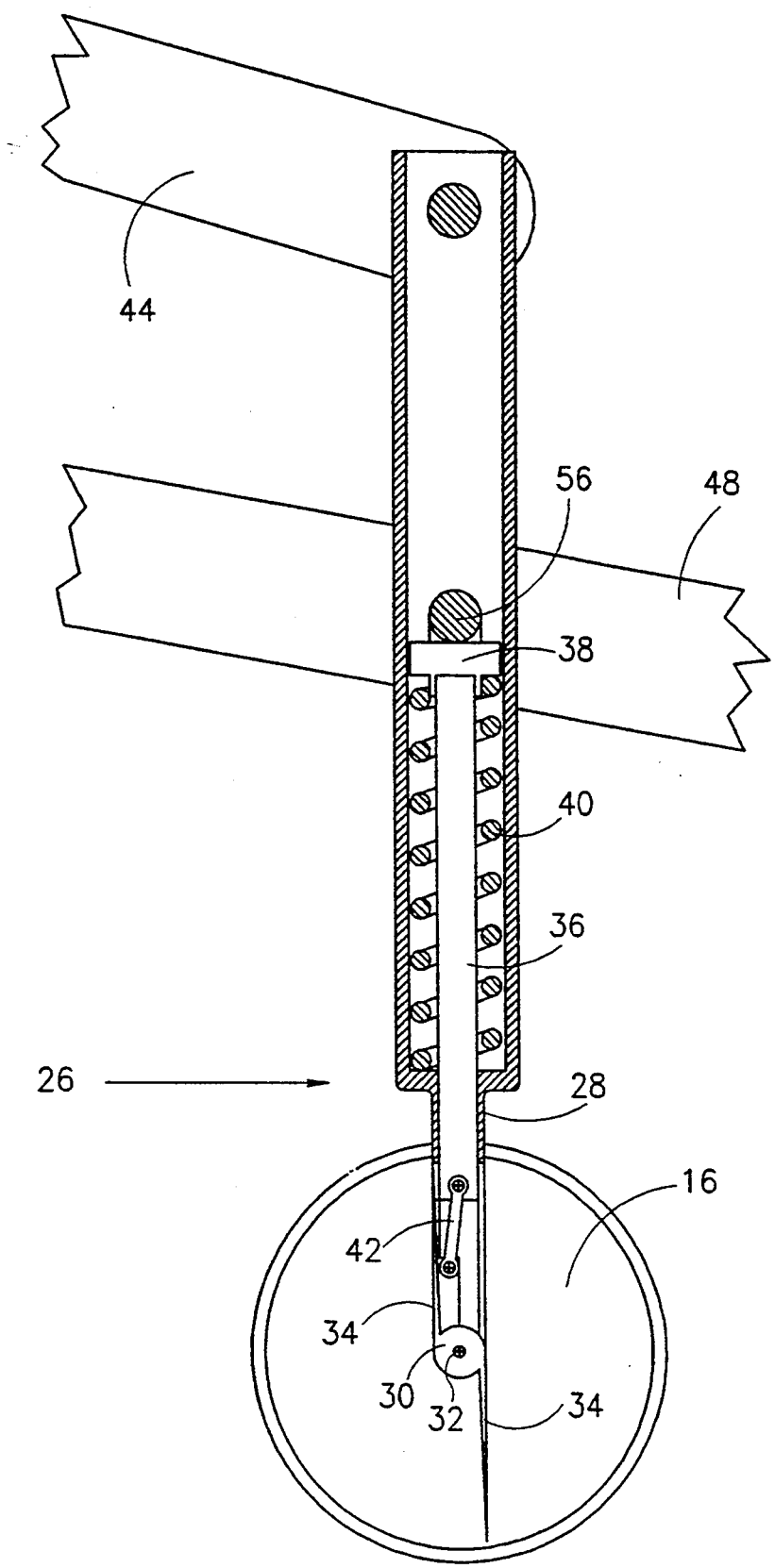
FIG. 3 is a side cross-sectional view of the piercing member of the device of FIGS. 1 and 2 with the blades extended along the axis of the piercing member.
Figure 4:
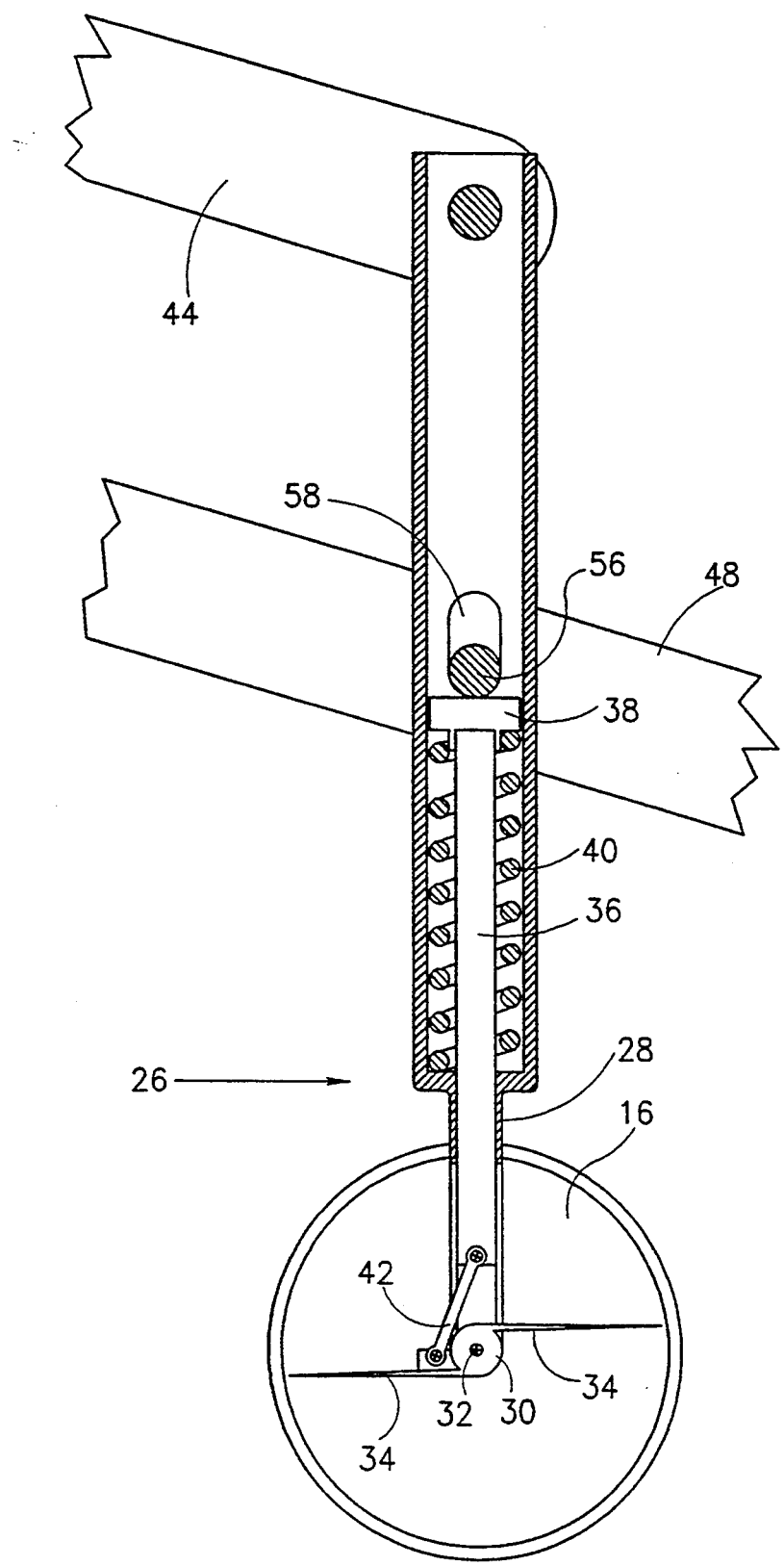
FIG. 4 is a side cross-sectional view as in FIG. 3 with the blades extended perpendicular to the axis of the piercing member.

In the embodiment of FIGS. 3 and 4, piercing member 26 has a body 28 and a pivotable member 30 which is pivotably connected to body 28 at or near the distal end of body 28 about a pivot point 32. Pivotable member 30 includes one or more blades 34 which extend radially outward from pivot point 32. In a preferred configuration illustrated in FIGS. 3 and 4 pivotable member 30 includes a pair of blades 34 oriented at 180° relative to each other. The distance between pivot point 32 and the far end of each of blades 34 is less than the inner diameter of the citrus fruit 16 so as to prevent damage to the peel of fruit 16 during operations. Preferably, distance between pivot point 32 and the far end of each of blades 34 is just somewhat less than the inner diameter of fruit 16 in order to maximize the separation of juice by allowing blades 34 to reach essentially all the meat of fruit 16.

A device according to the present invention further includes means for rotating pivotable member 30 so as to allow blades 34 to reach substantially all portions of fruit 16. Thus, in the example illustrated in FIGS. 3 and 4, means, which are described below, are provided for rotating pivotable member 30 from its initial position during the initial piercing of fruit 16 (FIG. 3) through approximately 90° (FIG. 4). As will be appreciated, such a movement of blades 34 while fruit 16 is being rotated about the axis of piercing member 16 allows virtually the entire inside of fruit 16 to be processed by blade 34 with one of blades processing substantially the lower half of fruit 16 while the other blade 34 processes substantially the upper half of fruit 16.

Any suitable means may be used for rotating pivotable member 30 about pivot point 32. One such means is illustrated in FIGS. 3 and 4. Body 28 includes two sections—an upper section with a relatively large inner diameter and a lower section with a relatively small inner diameter. Here, body 28 of piercing member 26 is hollow for accommodating a rod 36 which is slidable within the lower section of body 28. Rod 36 includes a head 38 of a diameter somewhat smaller than the inner diameter of the upper section of body 28.

Piercing member 26 includes a suitable biasing means for biasing rod 36 upward so that pivotable member 30 is in the default position shown in FIG. 1 suitable for initially piercing fruit 16 and for subsequently withdrawing piercing member 26 upon the completion of the processing. One such biasing means may be a spring 40 interposed between head 38 and the boundary between the upper and lower section of body 28.

Rod 36 is connected to pivotable member 30 in such a way that movement of rod brings about the rotation of pivotable member 30. For example, as in shown in FIGS. 3 and 4, both rod 36 and pivotable member 30 are pivotably connected to a connecting bar 42, with pivotable member 30 being connected to connecting bar 42 in an off-axis position such that when rod 36 is lowered somewhat relative to body 28 of piercing member 26 pivotable member 30 rotates through up to approximately 90° counterclockwise (FIG. 4).

The lowering of rod 36 relative to body 28 of piercing member 26 can be accomplished in a number of ways. One such way is illustrated in the Figures. As can be seen in FIGS. 1 and 2, piercing member 26 is pivotably connected at or near its upper end to a cross beam 44 which is, in turn, pivotably connected to a frame 46. Frame 46 is also connected to means for grasping 10 and means for rotating 12. Piercing member 26 is also connected in a manner which is described in more detail below, at a point substantially near its center, to a handle member 48 which is connected at one of its ends to frame 46 and which extends beyond its point of connection with piercing member 26 to form a handle with which the user can operate the device. A handle spring 50 connected between handle member 48 and frame 46 serves to bias handle member 48 toward frame 46 so that, in the absence of an external force supplied by the user, the device assumes the configuration shown in FIG. 1 which frees the area immediately above means for grasping 10 to facilitate the easy insertion and withdrawal of fruit 16.

The connection of piercing member 26 cross beam 44 and handle member 48 is such that piercing member 26 remains vertically oriented so as to effect vertical entry into fruit 16 (FIG. 2).

A device according to the present invention is designed to process a juicy fruit, such as various citrus fruits, which is substantially spherical. Since efficient processing depends partly on the ability to place pivot point 32 at substantially the center of fruit 16, as described below, it is anticipated that each device will be designed for a fruit of substantially the same size. Alternatively, a single device may be adjustable so as to variously accommodate, for example grapefruits and oranges.

As illustrated in FIGS. 1 and 2, frame 46 includes a mechanism for placing pivot point 32 at substantially the center of fruit 16. The mechanism is in the form of a stop 52 which prevents cross beam 44 from rotating past a certain point. The placement of stop 52 is designed to place pivot point 32 at substantially the center of fruit 16 (FIGS. 3 and 4). As will be readily appreciated, various mechanisms may be envisaged for automatically or semi-automatically placing pivot point 32 at or near the centerpoint of fruit 16.

Frame 46 if preferably further provided with a suitable switch 54 such as a microswitch, which is connected to frame 46. Switch is designed to activate means of rotation 12 whenever handle member 48 is lowered to its lowest position (as in FIG. 2). Similarly, when handle member 48 is raised from its lowest position, the rotation is automatically cut off.

As can best be seen from FIGS. 3 and 4, the connection between piercing member 26 and handle arm 48 is effected through the use of a protrusion 56 connected to handle arm 48 which is slidable within a slot 58 which is formed in piercing member 26.

The location and size of slot 58 and protrusion 56 are such that when cross beam 44 comes to rest on stop 52 protrusion 56 is found at the top of slot 58, as is shown in FIG. 3. In this position pivotable member 30 is oriented as shown in FIG. 3 with blades 34 coaxial with piercing member 26. Further downward pressure on handle arm 48 moves protrusion 56 downward within slot 58 until protrusion 56 reaches the lower boundary of slot 58, as in FIG. 4. In moving downward, protrusion 56 presses head 38 of rod 36 thereby causing rod to slide downward within piercing member 26, which motion, as described above, causes blades 34 to rotate approximately 90° counterclockwise.

In operation, a device according to the present invention would operate as follows. A fruit is inserted between the open arms 14 of means for grasping 10 (FIG. 1). Handle arm 48 is then grasped and lowered from its rest position (FIG. 1) until stop 52 prevents further movement. This position is shown in FIGS. 2 and 3. Switch 54 is activated causing means for rotation 12 to spin fruit 16 about a vertical axis at a desired angular velocity. In the process of lowering handle arm 48, and prior to the activation of the rotation, fruit 16 is pierced by piercing member 26 and pivot point 32 is placed substantially at the center of fruit 16.

At this point the user presses down further (FIG. 4) on handle arm 48 which causes the rotation of pivotable member 30 and brings about the threshing of the inside of fruit 16 by blades 34. The large centrifugal force causes the pits and other portions of fruit 16 to move to the inside walls of fruit 16, leaving the separated juice near the center.

Handle arm 48 is then moved upward to the position indicated in FIG. 1 and fruit 16 is removed. Into fruit 16 one can now insert a straw and proceed to drink the freshly prepared juice.

A second embodiment of piercing member 126 is illustrated in FIGS. 5 and 6. Here, body 128, which is deployed so that its lower end is at or near the bottom of fruit 16, includes a flexible shredding blade 134 which is tied at its lower end to body 128. Body 128 includes a slot 100 along its lower portion through which flexible shredding blade 134 can protrude (FIG. 6).

In the position corresponding to FIG. 3 of the above-described embodiment, flexible shredding blade 134 is taut (FIG. 5), typically under the force of a spring or other biasing member, similar to that shown in FIGS. 3 and 4. Upon further downward depression of handle member 48 (FIGS. 1 and 2) and corresponding to FIG. 4 of the above-described embodiment, flexible shredding blade 134 is bent (FIG. 6) and portions of it, at least partly under the influence of centrifugal forces, leave body 128 through slot 100. As flexible shredding blade 134 travels radially outward, the rapid rotation of fruit 16 causes flexible shredding blade 134 to shred through the meat of fruit 16 and effect the separation of the juice from the solid portions of fruit 16.

While the invention has been described with respect to a limited number of embodiments, it will be appreciated that many variations, modifications and other applications of the invention may be made.

What is claimed is:

1. A device for the in situ separation of the juice of a whole juicy fruit from the rest of the fruit, comprising:
   (a) means for grasping the juicy fruit;
   (b) means for rotating the grasped juicy fruit, said means for rotating being connected to said means for grasping;
   (c) a piercing member for piercing the juicy fruit being grasped by said means for grasping, said piercing member having a body and a shredding member connected to said body; and
   (d) means for moving said shredding member connected to said piercing member, said means for moving said shredding member causing said shredding member to move within the juicy fruit as the juicy fruit is rotated, said rotation of the juicy fruit taking place at sufficiently high rotational rate so as to bring about the separation of the juice of the juicy fruit from the rest of the juicy fruit by centrifugal force.

2. A device as in claim 1, wherein said shredding member is a pivotable member pivotably connected to said body, said pivotable member being pivotable about a pivot point so as to move within the juicy fruit as the juicy fruit is rotated to thereby bring about the separation of the juice of the juicy fruit from the rest of the juicy fruit, and wherein said means for moving said shredding member is a means for rotating said pivotable member about said pivot point.

3. A device as in claim 1, wherein said means for grasping includes a plurality of pivotable arms.

4. A device as in claim 3, wherein each of said arms includes a counterbalanced weight and is pivotable in such a way that the rotation of the arms increases the force with which said arms grasp the juicy fruit.

5. A device as in claim 1, wherein said means for rotating includes a motor.

6. A device as in claim 5, wherein said motor rotates said means for grasping.

7. A device as in claim 2, wherein said pivotable member of said piercing member includes at least two blades extending radially outward from said pivot point.

8. A device as in claim 7, wherein the distance between said pivot point and the end of each of said at least two blades is somewhat less than the inner diameter of the juicy fruit.

9. A device as in claim 2, wherein said means for rotating said pivotable member includes a rod slidable within said piercing member, said rod being connected to said pivotable member so that movement of said rod brings about the rotation of said pivotable member.

10. A device as in claim 9, wherein said rod is biased so that, in the absence of external forces, said pivotable member extends from said pivot point along the axis of said piercing member.

11. A device as in claim 10, wherein said rod is biased by a spring.

12. A device as in claim 1, wherein said shredding member is connected to said body so as to move within the juicy fruit as the juicy fruit is rotated to thereby bring about the separation of the juice of the juicy fruit from the rest of the juicy fruit, and wherein said means for moving said shredding member is a means for bending said shredding member so as to cause said shredding member to penetrate the fruit.

13. A device as in claim 1, wherein said piercing member is pivotably mounted on a frame, said frame being connected to said means for grasping and said means for rotating.

14. A device as in claim 13, wherein said piercing member is mounted in such a way that when said piercing member is deployed said means for rotating are automatically activated.

15. A device as in claim 14, wherein said activation is effected using a microswitch mounted on said frame.

16. A method for the in situ separation of the juice of a whole juicy fruit from the rest of the fruit, comprising the steps of:
(a) grasping the juicy fruit;
(b) rotating the grasped juicy fruit;
(c) piercing the grasped juicy fruit using a piercing member, said piercing member having a body and a shredding member connected to said body; and
(d) moving said shredding member within the juicy fruit as the juicy fruit is rotated at sufficiently high rotational rates so as to thereby bring about the separation of the juice of the juicy fruit from the rest of the juicy fruit by centrifugal force.

* * * * *